3,551,555
COATED IMMUNOCHEMICAL REAGENT PARTICLES AND PROCESS OF PREPARATION
Antonius Hermanus Wilhelmus Maria Schuurs, Oss, Netherlands, assignor to Organon Inc., West Orange, N.J., a corporation of New Jersey
No Drawing. Filed Mar. 28, 1966, Ser. No. 537,692
Claims priority, application Netherlands, Apr. 15, 1965, 6504823
Int. Cl. G01n 31/00, 33/16
U.S. Cl. 424—12                                        15 Claims

ABSTRACT OF THE DISCLOSURE

A reagent for immunochemical determinations is prepared by precoating finely divided solid carrier particles with a protein which is inert to and does not take part in the immunochemical reaction, and then adsorbing on said particles either an antigen or an antibody.

---

The invention relates to new immunochemical reagents, to their manufacture and to the stable test results obtained with them.

In immunochemical methods use is often made of inert particles as carriers for the antigen or for the antibodies in order thus to make the reaction between antigen and antibody visible by clumping together of the particles, which phenomenon is termed agglutination. In it the antigen or antibodies are attached to or adsorbed on the particles whether or not by applying auxiliaries.

As carriers are used erythrocytes (see for example Netherlands patent specification No. 106,360 and the literature mentioned in it), further for instance bentonite, collodium, cholesterol crystals, quartz and synthetic resins, as described by R. Weinbach in Schweiz. Z. Path. Bakt. 21, 1044 (1958), and finally kinds of synthetic latex, for example polystyrene (see U.S. patent specification 3,088,875). Especially these kinds of latex are used widely on account of their favourable constant physico chemical properties.

Frequently used are latex particles sensitized with human γ-globuline for the demonstration of the rheumatoid factor. In it the most favourable fact occurs that only the γ-globuline adsorbed at the particles reacts with the rheumatoid factor, while the excess of γ-globuline in the solution practically does not disturb the reaction. In general, however, non-adsorbed antigen renders the agglutination reaction less sensitive, because it is also capable of binding antibodies in the liquid phase, so that more antiserum is required to bring about agglutination. This is a most disadvantageous factor especially in methods based on inhibition of the agglutination.

It is desirable to allow such a quantity of antigen to adsorb on the particles that only a little antiserum (strongly diluted) is sufficient to bring about a clear agglutination. With such a reagent a very small quantity of the antigen can already be detected in the liquid to be examined by means of inhibition of the agglutination; in other words: attempts are being made to find means to improve the sensitivity of these immunochemical reactions. Moreover it is required in the preparation of these reagents to choose such conditions that the reagent is specific for the antigen to be determined or the antibodies corresponding with it.

The carriers used at present show, however, phenomena which strongly injure the specificity and sensitivity of the estimations performed with them. Reference can be made in this respect to non-specific agglutination or agglutination inhibition comprising those reactions caused by other phenomena than immunochemical. Thus it has been observed, for example, that particles loaded with antigen may agglutinate spontaneously in the absence of antiserum. In other cases it was found that these particles agglutinated not only after mixing with specific antiserum, but also when contacted with normal serum or antiserum against other antigens. In other cases again it appeared that the quantity of antiserum required for a complete agglutination was abnormally high. Probably these phenomena find their origin in the physicochemical properties of the particles used, and especially in their electrochemical characteristics. By the adsorption of protein-like substances the said properties are greatly influenced, the quantity and nature of the adsorbed material playing an important part.

Surprisingly it has been found now that a specific and sensitive reagent can be prepared for immunochemical estimations by first allowing a protein inert to the determination method to adsorb on the suspended particles and next the antigen or the antibodies. Thus a reagent is obtained with which very small quantities of antigen or antibodies can be determined selectively. By an inert protein is meant in this respect a protein not taking part in the immunochemical reaction and not influencing the antigen or the antibodies detrimentally. For this method can be used conjugated or non-conjugated proteins, further peptides of varying molecular weights and proteins of vegetable origin.

The particles treated according to the invention give a specific agglutination with the corresponding antiserum, even in a relatively strong dilution. This also means that agglutination inhibition is possible with much smaller quantities of antigen present in the liquid to be examined, so that thus very small quantities, for example one international unit (I.U.) of human chorionic gonadotropin (HCG) per ml. liquid, may be demonstrated. One I.U. corresponds practically with 0.1 μg. of hormone.

The method according to the invention also has the advantage that less antigen is required for the sensitisation that the quality of the agglutination has strongly improved owing to which the transitions are more pronounced and can be better read off, and finally that the preparation of sensitized particles has become less critical and better reproducible. A further advantage of the invention is the following: The agglutination inhibition reaction may be carried out on a slide with a perfectly wettable surface according to method (a) of Example 1. After the reaction has taken place, the mixture may be allowed to dry in a horizontal position. The result can still be read from the dried material and can be kept as a record.

The treatment of the carrier particles, hereinafter termed presensitisation, is preferably performed as follows. The particles are sedimented from their suspension by centrifugation, whereupon they are suspended in a solution of the inert protein, preferably in a buffer, when adsorption of the protein on the particles takes place. Next, the excess of inert protein is removed, for instance by centrifugation of the particles. Next the adsorption of the antigen or the antibody is brought about in a conventional manner (sensitisation). It has also proved possible, however, to perform the sensitisation in the solution of the inert protein, in which case the antigen or antibody is added immediately after the homogenisation of the particles in the solution of the inert protein.

The present invention can be used to great advantage for synthetic latex, for instance polystyrene latex, styrene-butadiene-latex and acrylic-latex, preferably with a particle size of from about 0.5 to about 1.3μ. It is known that this latex is stabilized by application of surface active substance and, although the suspension liquid is removed before the adsorption of antigen, it is certain that not all the surface active substance has disappeared from the surface of the particles. As is known, these substances can denature proteins by which the immunochemical properties of these proteins can be influenced detrimentally. After application of the method according to the invention, no non-specific agglutinations or inhibitions thereof have been found with this latex, so that the conclusion may be drawn that the detrimental influence of the remaining surface active substances is neutralized by the inert protein in the pre-sensitisation, so that the applied antigen is fully available for the agglutination.

Further it has been found that excellent results are obtained by using a serum albumin, for instance bovine serum albumin, and also egg albumin and lactalbumin. Other inert proteins to be applied in the present process are for instance serum globulins, haemoglobin and lactoglobulin. Further, mixtures of inert proteins can be applied. The choice of the inert protein is determined by the nature of the immunochemical determination.

The ratio of the quantities of inert protein and carrier substance and their concentration giving optimal results, are dependent on the nature of the inert protein, the carrier and the antigen or antibody.

The present process can take place at different pH values and in various buffer systems.

Finally it has been found that the stability of the reagent and the quality of the agglutination reaction is improved by performing the pre-sensitisation and/or sensitisation at a higher temperature, preferably between 50° and 60° C. Usually a period of from 1 to 20 hours is satisfactory. The same effect is obtained when the particles are incubated at a higher temperature, to a maximum of 100° C. after the presensitisation and/or sensitisation has been performed at room temperature. It has been found that the incubation performed after the sensitisation for a period of 1–20 hours, depending on the temperature used, has a favourable effect. Particularly after incubation of 1 hour at 100° C. after sensitisation particles with excellent properties are obtained.

The method according to the invention can be applied to all kinds of other solid carrier substances, such as bentonite particles, quartz particles, erythrocytes, cholesterol crystals, ion-exchanging resins e.g. Dowex 2–X8 and Amberlite CG–400 (styrene-divinyl benzene copolymer anion exchange resins), insoluble organic pigments and collodium particles. When use is made of non-pretreated carriers, changes in the structure may occur in the adsorbed antigen or antibody, and that by the presence of strongly active spots on the adsorbing surface (adsorption-denaturation). As these changes in the structure have a detrimental effect on the agglutination of the antigens, it is clear that the pre-sensitisation according to the invention, in which the strongly active spots are occupied by inert protein, is of great use for all these carriers. Besides it is also assumed that on the surface of the carrier particles there are deep pores, in which antigen can be adsorbed which is no longer capable of reacting with the antibody causing agglutination. Also with the occurrence of this phenomenon, according to which during the pre-sensitisation the deep pores would be filled with inert protein, the useful effect of the present pre-treatment is evident.

Very good results have, for instance, been obtained in determinations of human chorionic gonadotropin in the urine of pregnant women. When, for instance, use is made of bovine serum albumin as inert protein in the pre-sensitisation and polystyrene latex as carrier, a reagent is obtained which is very sensitive and also very specific. The process according to the invention can also be applied to advantage in immunochemical determinations based on the agglutination or the inhibition thereof of other antigens or their antibodies. As examples thereof are mentioned growth hormone of human or animal origin, follicle ripening hormone, serum proteins, such as γ-globulin (to demonstrate the rheumatoid factor), and antigens of bacterial origin, such as of *Treponema reiteri* and *T. pallidum*.

Suspensions of the carrier particles obtained by the treatment according to the invention can be used as such for the determinations in question or can be brought into powder form e.g. by freeze-drying. If desired tablets can be made, from said powder, containing all the necessary ingredients for the performance of the immunochemical determination together with the necessary excipients for compression of the powder to pharmaceutically acceptable tablets. These tablets are easily resuspendable in buffer solutions to give a homogeneous suspension suitable for immunochemical reactions.

Hereafter follow some examples to illustrate the invention:

EXAMPLE I

The particles of 10 ml. of polystyrene latex, Bactolatex 0.81 of Difco Laboratories, Detroit, Mich., were sedimented by centrifugation and next suspended in 10 ml. of 0.14 M borate buffer of pH 8.3, in which 2 mg. of bovine serum albumin (BSA) per ml. were dissolved. The suspension was incubated for 90 minutes at 20° C., after which the suspension was centrifuged again. After that the latex particles were washed once with 20 ml. of the said buffer and next resuspended in 10 ml. of this buffer, to which per ml. 100 I.U. of HCG were added. The mixture was now also incubated for 90 minutes at 20° C., after which the particles were centrifuged and washed twice with 20 ml. of the buffer. The thus pre-sensitised and sensitised latex was suspended in 6.7 ml. of 0.07 M borate buffer of pH 8.3, to which 4% sucrose and 0.01% Merthiolate (thimerosal) were added. The sensitised particles can be agglutinated with antiserum against HCG.

Hereafter a few methods are described for the performance of agglutination and agglutination inhibition reactions:

(a) Two drops of a physiological salt solution, one drop of the antiserum against HCG diluted to the desired potency with 0.15 M imidazole buffer of pH 7.8 and containing 3% of bovine serum albumin, and one drop of the prepared latex suspension are mixed with a spatula on a glass slide and spread over a round surface of from 2.5 to 3 cm. diameter. After that the glass slide is made to incline slightly while rotating slowly from one side to the other. After one or two minutes the particles agglutinate, which can be seen easily with the naked eye. In the performance of the agglutination inhibition reaction the physiological salt is replaced by the antigen solution.

After the period of 1 or 2 minutes rocking, the glass slide can be placed on a horizontal surface and the reaction mixture allowed to dry. The presence or absence of agglutination can be read from the dried reaction mixture. The results of the tests can thus be kept as a record.

(b) Another method uses centrifugation and is performed as follows:

0.5 ml. of physiological salt or an antigen solution is mixed with 0.5 ml. of antiserum in a suitable dilution in 0.15 M imidazole buffer of pH 7.8, to which bovine serum albumin is added to a concentration of 0.1%. To it a drop of the latex suspension diluted 5 times with a physiological salt solution is added. Next the mixture is incubated for 1 hour at 37° C. and next centrifuged for 10 minutes at 1500 rotations per minute. A turbid supernatant indicates that no agglutination has taken place; a clear solution points to agglutination. Various methods to make agglutination visible have been described amongst others by K. J. Bloch in Bull. Rheum. Dis. 9, 185 (1959) and by L. Fleck et al. in Nature 194, 548 (1962).

The agglutination of the latex prepared according to this example takes place only with specific antisera and can be inhibited with HCG in a concentration of 2 I.U. per ml., which proves the sensitiveness of this reagent.

EXAMPLE II

Two suspensions were prepared according to Example I in borate buffer with 4% sucrose and 0.01% Merthiolate.

One of them was submitted to an incubation for 20 hours at 56° C., the other for 1 hour at 100° C. The suspensions obtained agglutinates only with specific antisera. The agglutination reactions can be inhibited with HCG in a concentration of 1 I.U. per ml. The latter suspension proved to be the most sensitive.

EXAMPLE III

A suspension of Bactolatex 0.81 was pre-sensitised with bovine serum albumin as described in Example I, after which the suspension was incubated for 2 hours at 60° C. Next the particles were sensitised with HCG, after which incubation took place again for 2 hours at 60° C. In the agglutination and agglutination inhibition test the reagent proved to be very specific and extremely sensitive.

EXAMPLE IV

The latex of Example I was pre-sensitised with bovine serum alubmin as described in the said example and next sensitised with HCG for 180 minutes at 45° C. The obtained reagent agglutinates only with a specific antiserum and is very sensitive.

EXAMPLE V

The particles of 10 ml. of Bactolatex 0.81 were sedimented by centrifugation and next suspended in 5 ml. of 0.14 M borate buffer of pH 8.3, in which 4 mg. of bovine serum albumin per ml. were dissolved. After homogenisation of the suspension 5 ml. of the same buffer were immediately added, in which 200 I.U. of HCG per ml. were dissolved. After homogenising again the suspension was left to stand at 20° C. for 90 minutes. Next the particles were centrifuged and washed twice with 20 ml. of the buffer. Finally the washed particles were resuspended in 0.07 M borate buffer of pH 8.3 with 4% sucrose and 0.01% Merthiolate and incubated for 10 hours at 56° C.

EXAMPLE VI

The particles of 20 ml. of Bactolatex were suspended after centrifugation in 20 ml. of 0.14 M borate buffer of pH 8.3, in which 2 mg. of bovine serum albumin per ml. were dissolved. After that the obtained suspension was incubated, centrifuged and washed as described in Example I and next suspended in 20 ml. of the buffer, to which 100 $\mu$g. of human growth hormone (HGH) per ml. were added. Next the suspension was left to stand at 20° C. for 2 hours, whereupon the particles were centrifuged and washed twice with 30 ml. of the buffer. The thus treated latex was suspended in 14 ml. of 0.07 M borate buffer of pH 8.3, to which 4% sucrose and 0.01% Merthiolate were added.

The sensitised particles can only be agglutinated with specific antiserum. This agglutination can be inhibited with HGH in concentrations from 0.5 $\mu$g. per ml.

EXAMPLE VII

By the method of Example I Bactolatex was submitted to a pre-sensitisation with egg albumin using a concentration of the albumin of 6 mg. per ml. The thus obtained suspension was next sensitised with HCG in the described manner to obtain a reagent which can agglutinate with specific antiserum. This agglutination can already be inhibited with HCG in concentrations of 1–3 I.U. per ml.

EXAMPLE VIII

By the process described in Example I Bactolatex was pre-sensitised with lactalbumin instead of bovine albumin in a concentration of 2 mg. per ml. Next the obtained suspension was sensitised with HCG in a concentration of 100 I.U. per ml. This reagent, too, agglutinates only with specific antiserum, while inhibition of the agglutination takes place already with HCG concentrations of a few I.U. per ml.

EXAMPLE IX

By the method described in Example I latex particles were pre-sensitised with egg albumin in a concentration of 6 mg. per ml. and next sensitised with bovine serum albumin in a concentration of 300 $\mu$g. per ml. This reagent can agglutinate with antiserum against bovine serum albumin. For the agglutination reaction the antiserum is diluted with a buffer to which 3% egg albumin is added. The agglutination is inhibited at a certain antiserum dilution by concentrations from 0.3 $\mu$g. of bovine serum albumin per ml.

EXAMPLE X

A suspension of latex particles of Dow Chemical Co., Midland, Mich., of a diameter of 0.56$\mu$ and a concentration of 1.25% was pre-sensitised with bovine serum albumin and sensitised with HCG by the method described in Example I.

In the same manner latex particles of 0.80$\mu$ diameter, also from Dow Chemical Co., were pre-sensitised and sensitised.

In the same manner a latex with particles of 1.3$\mu$ diameter from the same firm was treated with bovine serum albumin and HCG. The specificity and sensitiveness of these reagents were excellent.

EXAMPLE XI

Dow latex particles of 0.80$\mu$ diameter were pre-sensitised with bovine serum albumin in a concentration of one mg. per ml. and next sensitised with human $\gamma$-globulin in a concentration of 300 $\mu$g. per ml. by the method described in Example 1. With this reagent agglutination can be brought about both with a horse serum against human serum proteins and with human sera containing the rheuma factor.

EXAMPLE XII

Dow latex particles of 0.80$\mu$ diameter were pre-sensitised with bovine serum albumin in a concentration of 2 mg. per ml. and next sensitised with follicle ripening hormone of human origin in a concentration of 100 $\mu$g. per ml. by the method described before. Agglutination can be brought about with a specific antiserum and inhibited by the hormone in concentrations from about 1 $\mu$g. per ml.

EXAMPLE XIII

Bactolatex was pre-sensitised with bovine serum albumin in a concentration of 2 mg. per ml. and sensitised with the euglobulin fraction of a rabbit antiserum against HCG in a concentration of 5 $\mu$g. per ml. Agglutination of these particles could be brought about with a solution of HCG in a concentration of 5 I.U. per ml.

EXAMPLE XIV

A suspension of bentonite was prepared according to the prescription of J. Bozicevich described in Immunochemical Methods (Blackwell Scientific Publications, Oxford 1964), p. 98 sq. In this process a so-called sodium-bentonite was taken as starting material. This suspension was presensitised in a concentration of 2% with bovine serum albumin in a concentration of 1 mg. per ml. and sensitised with HCG in a concentration of 200 $\mu$g. per ml. by the process described in Example I.

EXAMPLE XV

One ml. of a 10% solution of mastix in absolute alcohol was added while stirring vigorously to 24 ml. of 0.1 M borate buffer of pH 8.2 (see A. A. Pit, Ned. T. Geneesk, 103, 2310 (1959)). Five ml. of the obtained suspension were mixed with 0.3 ml. of 3% bovine serum albumin and next with 0.2 ml. of HCG in a concentration of 750 I.U. per ml. After incubating for 20 hours at 20° C. the thus prepared suspension was used without further treatment. With anti HCG sera a specific agglutination can be brought about. HCG in a concentration from 3 to 5 I.U. per ml. can inhibit the agglutination when choosing the correct antiserum dilution.

What is claimed is:

1. A reagent for immunochemical determinations comprising finely divided solid particles haivng adsorbed on the surface thereof an inner coating of a protein which is inert to and does not take part in the immunochemical reaction and does not deterimentally influence the antigen or antibodies involved in the reaction, and carrying an outer coating of a member selected from the group consisting of an antigen and an antibody.

2. The reagent of claim 1 in which the particles are a synthetic latex.

3. The reagent of claim 2 in which the latex is a polystyrene latex having a particle size between about 0.5 and about 1.3 micron.

4. The reagent of claim 1 in which the inert protein is selected from the group consisting of serem albumin, egg albumin, and lactalbumin.

5. The reagent of claim 1 in which the antigen is human chorionic gonadotropin.

6. The reagent of claim 1 suspended in an aqueous medium.

7. Method for the preparation of a reagent for immunochemical determinations comprising the steps of adsorbing on the surface of finely divided solid particles a protein which is inert to and does not take part in the immunochemical reaction and does not detrimentally influence the antigen or antibodies involved in the reaction, and then adsorbing on said protein-coated particles an outer coating of a member selected from the group consisting of an antigen and an antibody.

8. The method of claim 7 in which the particles are in suspension in an aqueous medium.

9. The method of claim 7 in which the adsorption is carried out at a temperature between about 20° C. and 60° C.

10. The method of claim 7 in which the coated particles are further incubated at a temperature between about 20–100° C. for a period of about 1–20 hours.

11. The method of calim 7 in which the coated particles are further incubated at about 100° C. for about one hour.

12. The method of claim 7 in which the particles are a synthetic latex.

13. The method of claim 11 in which the latex is polystyrene having a particle size between about 0.5 and about 1.3 micron.

14. The method of claim 7 in which the inert protein is selected from the group consisting of serum albumin, egg albumin, and lactalbumin.

15. The method of claim 7 in which the antigen is human chorionic gonadotropin.

References Cited

UNITED STATES PATENTS

| | | | |
|---|---|---|---|
| 3,234,096 | 2/1966 | Pollack | 167—84.5 |
| 3,236,732 | 2/1966 | Arquilla | 167—84.5 |
| 3,074,853 | 1/1963 | Brewer | 424—12 |

OTHER REFERENCES

Strausser, Studies on Development and App. of Modified Hemagglutination Procedures, 1958 University Microfilms, Mic 59–1831, pp. 66–68.

Chem. Abs., vol. 61, 1964, p. 16608d; vol. 62, 1965, p. 5732e.

ALBERT T. MEYERS, Primary Examiner

A. P. FAGELSON, Assistant Examiner

U.S. Cl. X.R.

424—13